United States Patent

Morgan et al.

[11] Patent Number: 5,320,653
[45] Date of Patent: Jun. 14, 1994

[54] AIR PRECLEANING APPARATUS

[75] Inventors: Jeffrey S. Morgan, Stoughton; James A. Debilzen, Oregon; Kenneth M. Tofsland, Stoughton, all of Wis.

[73] Assignee: Nelson Industries, Inc., Stoughton, Wis.

[21] Appl. No.: 65,135

[22] Filed: May 20, 1993

[51] Int. Cl.$^5$ .......................................... B01D 45/12
[52] U.S. Cl. ........................................ 55/337; 55/346; 55/347; 55/348
[58] Field of Search ............... 55/337, 346, 347, 348, 55/396, 399, 447, 448, 449, 450

[56] References Cited

U.S. PATENT DOCUMENTS

| | | | |
|---|---|---|---|
| 4,050,913 | 9/1977 | Roach | 55/347 X |
| 4,242,115 | 12/1980 | Harold et al. | 55/347 |
| 4,261,710 | 4/1981 | Sullivan | 55/337 X |
| 4,289,611 | 9/1981 | Brockmann | 55/348 X |
| 4,746,340 | 5/1988 | Durer et al. | 55/347 |

Primary Examiner—Charles Hart
Attorney, Agent, or Firm—Andrus, Sceales, Starke & Sawall

[57] ABSTRACT

A vortex air precleaner having snap-fit, self-sealing vortex tubes. Each vortex tube includes a flexible lip projecting laterally outward from the tube and spaced from an end of the tube. An annular shoulder is located between the lip and the tube end and spaced from the lip to provide a groove therebetween. The portion of the tube extending from the shoulder to the tube end is tapered inwardly and is formed with a plurality of longitudinal slits to provide the tube end portion with radial flexibility. When the tube end is inserted within an opening in the wall of the precleaner, the end portion will flex inwardly enabling the precleaner wall to be engaged with the groove, and the flexible lip engages the surface of the precleaner wall to provide a tight sealed joint.

13 Claims, 2 Drawing Sheets

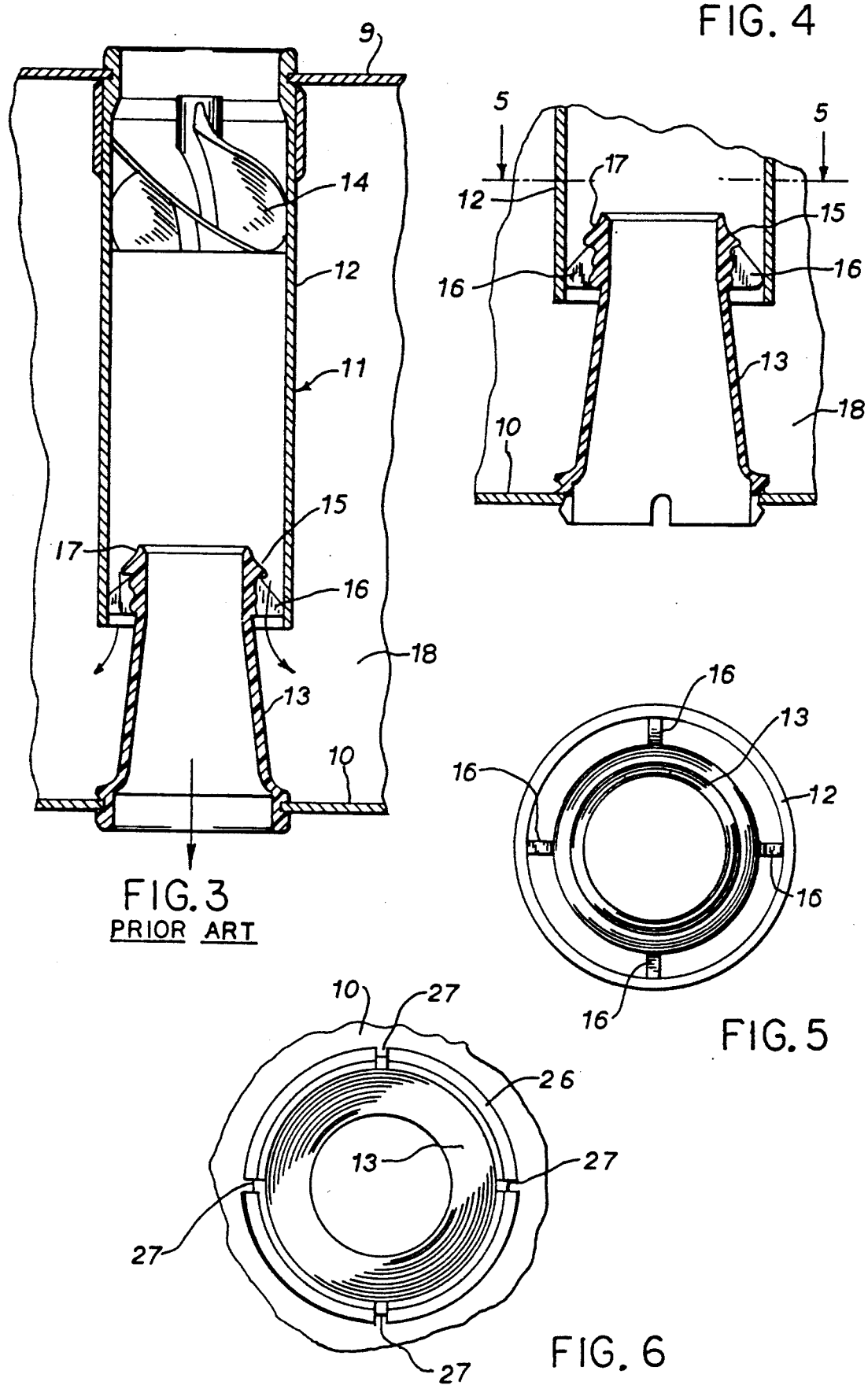

AIR PRECLEANING APPARATUS

BACKGROUND OF THE INVENTION

Air precleaners are frequently used with internal combustion engines of off-road vehicles, such as earth moving equipment, agricultural vehicles, and the like, which often operate in dusty environments. One common type of air pre-cleaner incorporates a group of vortex separators, which extend in parallel relation between an outer wall of the precleaner and an internal wall. Each vortex separator includes a generally cylindrical inlet tube, which is connected within an opening in the outer wall of the precleaner, and an axially aligned inner tube, that is connected with an opening in the inner wall. The downstream end of the inlet tube is spaced radially from the upstream end of the outlet tube to provide an annular clearance which communicates with a contaminate chamber between the outer wall of the precleaner and the internal wall. The downstream end of the outlet tube communicates with a second chamber which, in turn, is connected to the air cleaner for the engine.

The inlet tube of the typical vortex separator includes a plurality of vanes which cause the incoming particulate-laden air to be swirled outwardly. The heavy particulate material will swirl outwardly along the wall of the inlet tube and pass through the annular clearance to the contaminate chamber. The particulate material is scavenged from the contaminate chamber by connecting the contaminate chamber to a source of sub-atmospheric pressure, such as the exhaust system of the engine, thus drawing the particulate material out through the exhaust system.

In the typical vortex separator, the cleaner air flows along the vortex in the inlet tube, and passes through the outlet tube or nozzle and thus to the air cleaner for the engine.

It is important to provide a seal between the outlet tube of the vortex separator and the internal wall of the pre-cleaner. If the joint between the outlet tube and the internal wall is not sealed, particulate material can be drawn through the unsealed joint from the contaminate chamber to the air cleaner.

It has been the practice in the past to connect the tubes of the vortex separator to the walls of the pre-cleaner by a two-step operation. In this procedure, an annular ridge or shoulder is formed on the tube and spaced from the tube end. The end of the tube is then inserted within an opening in the wall of the pre-cleaner to bring the shoulder in engagement with a surface of the wall. A heated die is then employed in a second operation to curl or upset the projecting end of the tube and bring the upset end into engagement with the opposite surface of the wall.

Other types of connections have used gaskets or sealants to provide a seal between the vortex tubes and the wall of the air precleaner.

The use of the two-step upsetting operation, or the use of gaskets and sealants, contribute substantially to the overall cost of the precleaner, particularly when the typical precleaner may contain up to forty or more vortex separators.

SUMMARY OF THE INVENTION

The invention is directed to a vortex separator construction, and in particular to an improved snap-fit, self-sealing connection between the tubes of the vortex separator and the walls of the pre-cleaner.

In accordance with the invention, each tube of the vortex separator is provided with a flexible lip that projects laterally outward from the tube and is spaced from an end of the tube. An annular shoulder is located between the lip and the tube end, and is spaced from the lip to provide an annular groove therebetween.

The end portion of the tube extending from the shoulder to the tube end is tapered inwardly and is provided with a series of longitudinal slots which provide radial flexibility for the end portion of the tube.

To install the tube within an opening in the wall of the pre-cleaner, the end of the tube is inserted within the opening, and as the end portion of the tube rides against the wall bordering the opening, the end portion is flexed inwardly, enabling the wall to snap into engagement with the groove in the tube. The wall is then tightly held between the shoulder and the flexible lip. The flexible lip exerts a biasing force holding the wall against the shoulder and provides a tight sealed joint between the tube and the wall of the precleaner.

The invention can be utilized with both the inlet tube and outlet tube of the vortex separator and is particularly useful in connecting the outlet tube to the internal wall of the separator to provide a sealed joint which prevents the passage of contaminants through the joint area.

With the invention, the tubes are snap fitted into the openings of the precleaner wall in a single operation, thereby substantially decreasing the time of assembly, as compared to prior art methods utilizing upsetting or requiring gaskets or sealants.

Other objects and advantages will appear in the course of the following description.

DESCRIPTION OF THE DRAWINGS

The drawings illustrate the best mode presently contemplated of carrying out the invention.

In the drawings:

FIG. 3 is a longitudinal section of a prior art construction showing an attachment of a vortex separator tube to the wall of a precleaner;

FIG. 4 is a view similar to FIG. 3 showing the attachment of the invention;

FIG. 5 is a section taken along line 5—5 of FIG. 4;

FIG. 6 is a view taken along line 6—6 of FIG. 4; and

DESCRIPTION OF THE ILLUSTRATED EMBODIMENT

Figure 1:
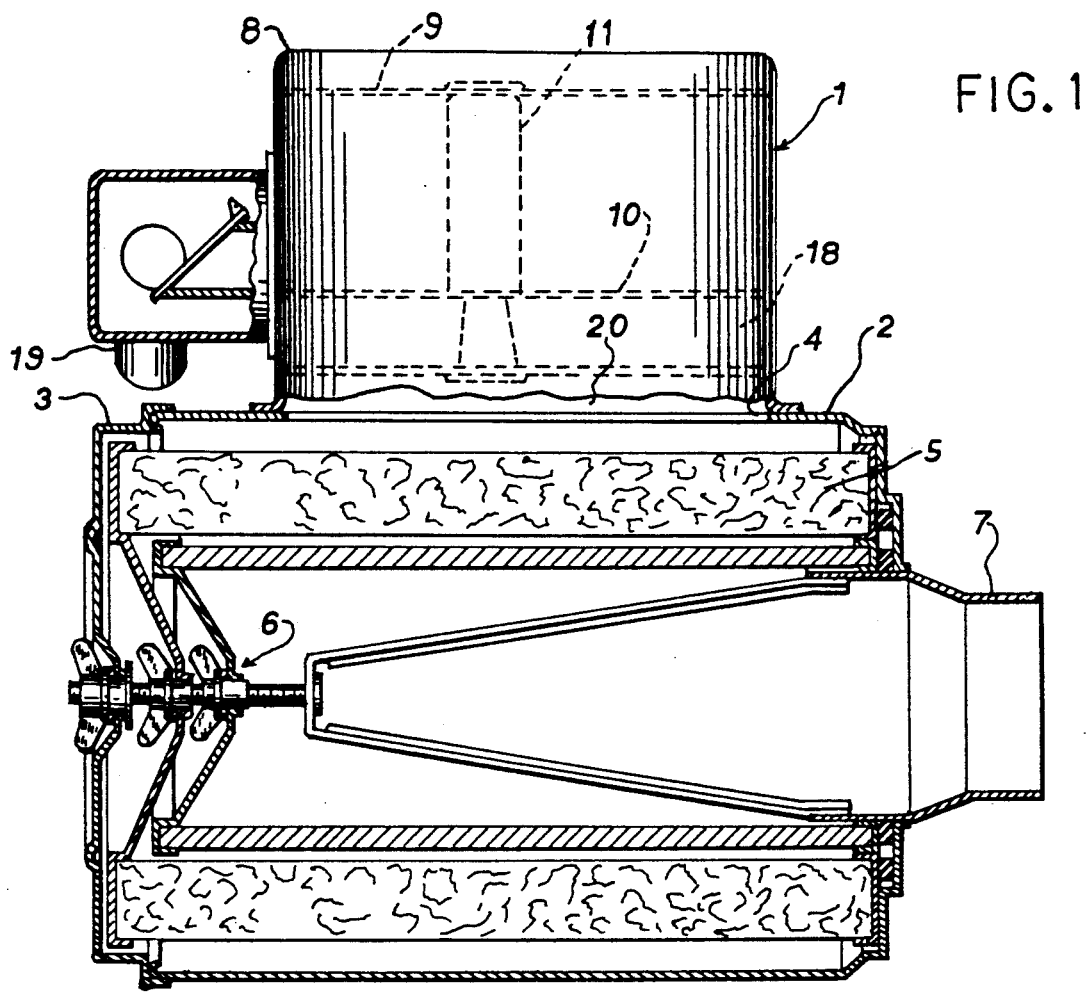
FIG. 1 is a longitudinal section showing the assembly of the precleaner with an air cleaner.
Figure 2:
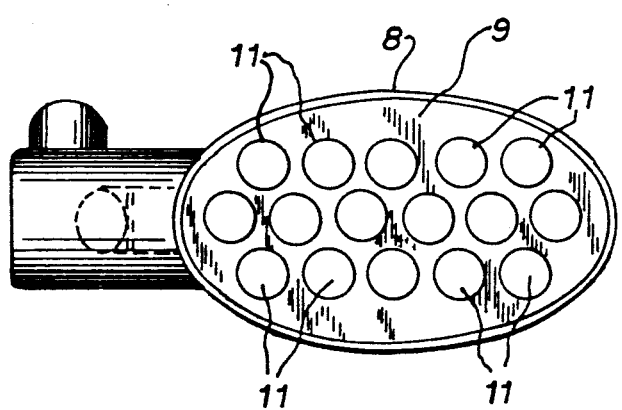
FIG. 2 is a top plan view of the construction shown in FIG. 1.
Figure 7:
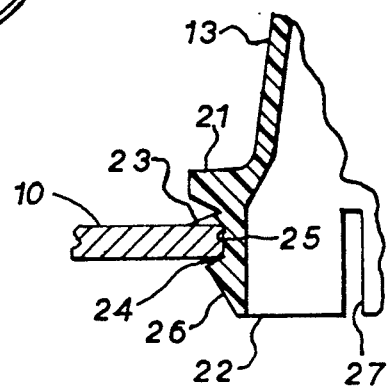
FIG. 7 is an enlarged fragmentary vertical section showing the attachment of the vortex tube to the precleaner wall.

FIG. 1 illustrates an air precleaner 1 which is attached to an air cleaner 2 for an internal combustion engine. The air precleaner 1 has particular application for use with internal combustion engines used in vehicles which are apt to encounter dusty conditions in operation, such as earth moving equipment, agricultural equipment, and the like.

The air cleaner 2 is a conventional type including an outer, generally cylindrical casing 3 having an inlet opening 4 in the side wall. An annular filter element 5 is located within the outer casing and is supported within the casing by a supporting structure indicated generally by 6. The end of the casing 3 is provided with an outlet 7 through which the clean air is supplied to the engine.

The precleaner 1 includes a housing 8 having an outer wall 9, and a generally parallel internal wall 10. A plurality of vortex separators 11 are mounted in parallel relation between outer wall 9 and internal wall 10. In practice, there may be up to forty or more vortex separators interconnecting the walls 9 and 10.

As best shown in FIG. 3, each vortex separator includes a generally cylindrical inlet tube 12 which is mounted within an opening in wall 9 and a tapered outlet tube or nozzle 13, which is axially aligned with tube 12 and is mounted within an opening in internal wall 10. Tubes 12 and 13 are preferably formed of a plastic material.

Located in the upper end of inlet tube 12 are helical vanes 14, which cause the incoming air to swirl outwardly, so that the heavier particulate material in the air stream will flow along the inner surface of inlet tube 12.

As best shown in FIG. 3 and 4, the downstream end of inlet tube 12 has a larger diameter than the upstream end of the outlet tube 13 to provide an annular clearance 15 between the tubes. To space the upstream end of outlet tube 13 from inlet tube 12, a plurality of ribs 16 project radially from the outlet tube and engage the inner surface of the inlet tube. In addition, the upstream end of outlet tube 13 is provided with an annular flange 17 which prevents upward flow of contaminants along the outer surface of the outlet tube and possible re-entrainment of the contaminants with the air stream passing through inlet tube 12.

The heavier contaminants being swirled outwardly along the inner surface of tube 12 flow through the annular opening 15 into contaminant chamber 18 which is located between walls 9 and 10. Contaminant chamber 18 is provided with an outlet 19, which is connected to a suitable source of sub-atmospheric pressure. In practice, the outlet 19 may be connected to the exhaust system of the engine, so that the pressure differential will draw or scavenge the contaminants from the chamber 18 through outlet 19, where they are discharged through the exhaust system.

The downstream end of the outlet tube 13 communicates with a chamber 20 which is connected to the inlet 4 of the air cleaner, so that cleaner air, which is being discharged through tube 13, will flow through chamber 20 to inlet 4 of the air cleaner.

In accordance with the invention, the tubes of the vortex separator 11 are snap fitted and sealed within the openings of the walls 9 and 10. In this regard, the description will be directed to the attachment of tube 13 to wall 10, but it is contemplated that a similar construction can be used to attach tube 12 to wall 9. As best seen in FIG. 3, tube 13 is provided with a radial flange 21, which is spaced from the end 22 of the tube. Located immediately adjacent flange 21 is a flexible annular lip 23, which in an unrestrained condition, extends downwardly and outwardly toward the tube end 22. Spaced longitudinally from lip 23 is an annular shoulder 24, and the space between the shoulder 24 and the lip 23 defines an annular groove 25.

The outer surface of the tube 13 extending from shoulder 24 to the tube end 22 is tapered inwardly, as indicated by 26. In addition, the end portion of the tube is provided with a plurality of circumferentially spaced open-ended longitudinal slots 27 that provide radial flexibility for the end position of the tube.

To install the tube 13 within an opening in the precleaner wall 10, the end of the tube is inserted within the opening and the tapered surface 26 will ride against the portion of the wall bordering the opening, thereby flexing the end portion of the tube inwardly until the wall 10 engages the groove 25. With the wall 10 engaged with the groove 25, the lip 23 will be deflected upwardly and will be engaged with the upper surface of the wall. The flexible lip not only biases the wall 10 into engagement with the shoulder 24, but also provides a seal to the surface of the wall to provide a tight sealed joint, which prevents the flow of contaminates from chamber 18 to chamber 20.

With the invention, the tubes of the vortex separator are snap fitted into the openings in the walls of the pre-cleaner in a single operation. No auxiliary components are required to provide the sealed connection and this significantly reduces the labor of assembly, as compared with prior methods of installing the vortex tubes.

The invention can be used to connect both the inlet and outlet tubes to the respective walls of the precleaner and is particularly useful in connecting the outlet tube 13 to the internal wall 10, thus providing a sealed connection which prevents the possible flow of contaminants from the contaminant chamber 18 to chamber 20, due to the differential in pressure between the two chambers.

Various modes of carrying out the invention are contemplated as being within the scope of the following claims particularly pointing out and distinctly claiming the subject matter which is regarded as the invention.

We claim:

1. In an air pre-cleaner, a wall having a first surface and a second surface and having an opening extending between said surfaces, a tube to conduct air, connecting means for connecting said tube in said opening, said connecting means comprising a flexible lip projecting laterally outward from the tube and spaced from an end of the tube, said lip being sealingly engaged with said first surface, an annular shoulder disposed between said lip and said tube end and spaced from said lip to provide a groove therebetween, said wall being disposed in said groove and said shoulder disposed in engagement with said second surface, an end portion of said tube located between said shoulder and said tube end having at least one longitudinal open-ended slot to provide radial flexibility for said end portion, insertion of said tube end in said opening causing said end portion to flex inwardly and permit engagement of said groove with said wall.

2. The precleaner of claim 1, wherein the outer surface of said end portion is tapered inwardly toward said tube end.

3. The precleaner of claim 1, and including a rigid annular abutment extending outwardly from said tube and located on the opposite side of said lip from said groove.

4. The precleaner of claim 1, wherein said lip in an unrestrained condition extends downwardly and outwardly toward said tube end.

5. The precleaner of claim 1, wherein said tube is composed of plastic.

6. In an air pre-cleaner, a wall having a first surface and a second surface and having an opening extending between said surfaces, a tube to conduct air, connecting means for connecting said tube in said opening, said connecting means comprising a flexible lip projecting laterally outward from the tube and spaced from an end of the tube, said lip in an unrestrained state extending downwardly and outwardly toward said tube, an annular shoulder disposed between said lip and said tube end and spaced from said lip to provide a groove therebetween, said wall being disposed in said groove, said lip being sealingly engaged with said first surface and said shoulder and said tube end having a plurality of longitudinal slits to provide radial flexibility for said end portion, the outer surface of said end portion being tapered inwardly from said shoulder toward said tube end.

7. An air cleaner apparatus, comprising an air precleaner including an outer wall and an internal wall, a vortex separator disposed in said precleaner, said vortex separator including an air inlet tube connected within an opening in said outer wall and an air outlet tube disposed coaxially of said air inlet tube and connected within an opening in said internal wall, said air inlet tube having a downstream end spaced radially from the upstream end of the outlet tube to provide an annular space therebetween, means disposed in said air inlet tube for swirling air outwardly therein to cause particulate material in the air to flow along the inner surface of said inlet tube and pass through said space to a contaminate chamber, connecting means for connecting the downstream end of the outlet tube to the internal wall, said connecting means including a flexible tapered annular lip disposed on the outer surface of the outlet tube and spaced from the downstream end, said lip being engaged with a surface of said internal wall, an annular shoulder spaced downstream from said lip and defining a groove therebetween, said internal wall disposed in said groove, a downstream end portion of the outlet tube located between the shoulder and said downstream end being flexible in a radial direction, and an annular radially extending flange disposed on the outer surface of the tube and located upstream of said lip.

8. The apparatus of claim 7, wherein the outer surface of said downstream end portion is tapered inwardly toward the downstream end.

9. The apparatus of claim 7, wherein said downstream end portion has at least one longitudinal open-ended slot to provide radial flexibility for said downstream end portion.

10. The apparatus of claim 7, and including a plurality of circumferentially spaced radial ribs on the upstream end of said outlet tube and disposed to engage the downstream end of the inlet tube to space the tubes apart.

11. The apparatus of claim 7, wherein said lip in an unrestrained condition extends diagonally toward the downstream end of the outlet tube.

12. In an air precleaner, a wall having a first surface and an opposed second surface and having an opening extending between said surfaces, a tube to conduct air in a downstream direction, connecting means for connecting said tube in said opening, said connecting means comprising an annular shoulder disposed upstream of the downstream end of the tube, an annular flange extending radially outward from the tube and located upstream of said shoulder to provide an annular space therebetween, said wall being disposed in said space and said shoulder disposed in engagement with said second surface, and a flexible lip projecting radially outward from the tube and located immediately downstream of said flange, said lip bordering said annular space and being sealingly engaged with said first surface.

13. The precleaner of claim 12, wherein said tube is composed of plastic.

* * * * *

UNITED STATES PATENT AND TRADEMARK OFFICE
CERTIFICATE OF CORRECTION

PATENT NO. : 5,320,653
DATED : June 14, 1994
INVENTOR(S) : JEFFREY S. MORGAN ET AL It is certified that error appears in the above-indentified patent and that said Letters Patent is hereby corrected as shown below:

Col. 5, Line 6, CLAIM 6, After "shoulder" insert --disposed in engagement with said second surface, and end portion of said tube located between said shoulder--

Signed and Sealed this

Thirteenth Day of September, 1994

Attest:

BRUCE LEHMAN

Attesting Officer

Commissioner of Patents and Trademarks